(12) United States Patent
Fomukong

(10) Patent No.: US 6,756,918 B2
(45) Date of Patent: **\*Jun. 29, 2004**

(54) METHOD AND APPARATUS FOR LOCATING MOBILE UNITS TRACKING ANOTHER OR WITHIN A PRESCRIBED GEOGRAPHIC BOUNDARY

(76) Inventor: Mundi Fomukong, 10853 Rose Ave. #49, WLA, CA (US) 90034

( * ) Notice: Subject to any disclaimer, the term of this patent is extended or adjusted under 35 U.S.C. 154(b) by 0 days.

This patent is subject to a terminal disclaimer.

(21) Appl. No.: 10/199,829

(22) Filed: Jul. 19, 2002

(65) Prior Publication Data

US 2002/0183077 A1 Dec. 5, 2002

Related U.S. Application Data

(63) Continuation-in-part of application No. 09/753,178, filed on Dec. 30, 2000, now Pat. No. 6,441,752.

(51) Int. Cl.[7] ............................................. G08G 1/123
(52) U.S. Cl. ...................... 340/988; 340/989; 340/992
(58) Field of Search ........................ 340/573.1, 573.3, 340/573.4, 573.7, 7.27, 7.28, 988, 989, 990, 992; 455/439, 404.2, 456.2, 457; 342/357.09, 357.1, 457, 463

(56) References Cited

U.S. PATENT DOCUMENTS

| | | | |
|---|---|---|---|
| 5,418,537 A | 5/1995 | Bird | |
| 5,504,491 A | 4/1996 | Chapman | |
| 5,517,690 A | 5/1996 | Linquist et al. | |
| 5,539,395 A | 7/1996 | Buss | |
| 5,669,061 A | 9/1997 | Schipper | |
| 5,689,245 A | 11/1997 | Noreen et al. | |
| 5,918,159 A | 6/1999 | Fomukong et al. | |
| 6,108,365 A | 8/2000 | Rubin et al. | |
| 6,181,253 B1 | 1/2001 | Eschenbach et al. | |
| 6,211,819 B1 | 4/2001 | King et al. | |
| 6,222,483 B1 * | 4/2001 | Twitchell et al. | 342/357.09 |
| 6,263,280 B1 * | 7/2001 | Stingone, Jr. | 342/457 |
| 6,414,635 B1 * | 7/2002 | Stewart et al. | 342/457 |

\* cited by examiner

Primary Examiner—Van T. Trieu (57) ABSTRACT

A mobile location reporting communication system consists of a network of communication sources and targets managed by one or more control stations. In the system, a communication source may request for the location of a mobile communication target from the network. The target conveys its location to the network and that information is provided to the source. In the invention a mobile communication source request for the location of mobile communication targets that are present in a prescribed geographic boundary. The network provides to the source only remote targets that are present in the prescribed boundary. Also in the invention, a concealed or clandestine mobile portable target, close to the mobile portable source, may be tracking the source. The source may invoke a method that may the result of mobile targets that have traveled a pre-specified distance with the source while maintaining proximity to the source.

27 Claims, 7 Drawing Sheets

METHOD AND APPARATUS FOR LOCATING MOBILE UNITS TRACKING ANOTHER OR WITHIN A PRESCRIBED GEOGRAPHIC BOUNDARY

CONTINUING DATA

This application is a continuation-in-part of U.S. application Ser. No. 09/753,178, filed Dec. 30, 2000 now U.S. Pat. No. 6,441,752, the disclosure is incorporated herein by reference.

BACKGROUND OF THE INVENTION

This invention relates to telecommunication services and systems, specifically such services and systems that convey the location of a mobile unit.

The wireless industry is currently gearing towards the provision of a wide range of location based services to the general public. Such services will include utilizing the location of a subscriber's portable remote unit to channel a wide range of location-based services to the subscriber. For such a service to be successful, the remote unit must be able to obtain and relay its location information to other communication targets of the network requesting such information.

In relevant prior art such as U.S. Pat. No. 5,689,245, Noreen and al, the location of a remote unit is employed to execute location specific instructions transmitted to the remote unit.

In Bird, U.S. Pat. No. 5,418,537, a missing vehicle is located through the use of a GPS receiver mounted on the vehicle. When the vehicle is missing, a paging request is broadcast by the vehicle location center. Upon receiving the broadcasted message, the vehicle resolves and conveys its location to the service center.

In Buss, U.S. Pat. No. 5,539,395, a remote unit is presented whereby the unit selects and displays messages matching the location of the remote unit. The network provides the unit with messages having a location signal. If the location signal picked up by the unit is within the unit's current location, the message is displayed, otherwise it is kept in memory for display at the appropriate location.

In Chapman, U.S. Pat. No. 5,504,491, a global status and positioning reporting system is described. A remote unit obtains its global location and updates the network with status information and location information as required. Such status information may include an emergency condition or relevant condition of the remote unit required by the network.

In Fomukong and al, U.S. Pat. No. 5,918,159 a location reporting satellite paging system with optional blocking of location reporting is disclosed. In that invention, a remote mobile unit obtains its location information and provides that information via the network to other network units requesting the information. The provision of such location information is done based on authorization information provided and routinely updated by the remote unit.

In all of the above-disclosed inventions, the location of the remote unit is utilized by the system. The deployment of location services could be quite beneficial to the general public if safely implemented. In today's market, such mobile units are usually small, compact and lightweight. These devices could easily be concealed to reveal the location of a mobile user without the user knowing or authorizing the disclosure of their location. Most wireless consumers might not want their location disclosed to the network or general public and the thought of being tracked by a clandestine unit concealed in an object such as a car or luggage to reveal the location of an individual would be unacceptable by the general public. The risk of abuse clearly exists and must be handled appropriately by wireless vendors. In U.S. Pat. No. 5,918,159 that provides authorization for location reporting, it would be almost impossible for the network to prevent a concealed location-reporting unit to provide the location of an individual being tracked, given an abuse is occurring. A need therefore exists for location reporting devices in a specific geographic region to reveal their location upon request. In situations where a user is being tracked, the network would be able to determine which units are tracking the user by querying for the location of remote units within a specified radius of the user or tracked unit. The techniques required to provide the above result are described in the invention.

Whenever a mobile user is stranded and requires immediate help, another mobile party may exist not too far from the location of the user. The mobile user may not be aware of the presence of the other mobile party at that geographic location. By paging for the location of portable remote units (PRUs) within the stranded area, a distressed subscriber may immediately sought help at that location. If the prescribed boundary specified by the mobile user exceeds pre-specified limits, the network may split that geographic area as described hereinafter. Pages may then be sent to specific areas in order to obtain the location of portable remote units in that geographic area. The location of any mobile location-reporting unit in a geographic area that is closest to the user will be revealed to the user.

Lots of other uses exist for such a service to be lucrative to a service provider. A wireless subscriber may opt to participate in the program and users of the system may be charged a fee each time the location of another PRU at a requested geographic boundary is provided to the user Also, users in possession of portable remote units may be charged whenever they invoke the tracking mode in their PRU. To improve subscriber enrollment in the program, subscribers may also received benefits each time their location is provided to a distressed individual. Subscribers not requiring their locations disclosed at any time may block such information at the network. In situations where a PRU user is being tracked by another, the network will only reveal the location of the tracking unit only after both units have traveled a certain distance over a pre-specified period of time with the tracking unit maintaining proximity to the source during that period. Such distances and elapse times could be set as a standard by the industry to clearly define tracking.

The system presented requires mobile devices to communicate their location information to the network. As the number of location enabled devices within the network increases, certain components of the system may require the location of certain mobile devices reported in a manner that would prevent the component from being overloaded. Therefore, it is required that, a method and apparatus be provided to facilitate the provision of remote unit location information to the network to prevent network overloading and also minimize power consumption of the mobile device.

From the above there is clearly a need for a system whereby a remote unit should be able to request for the location of other remote units within a specific geographic area. The components of such a system are described hereinafter.

OBJECTS OF THE INVENTION

It is an objective of the present invention to provide a mobile telecommunication system, method and technique that could facilitate the secure provision of location information pertaining to one or more mobile communication targets that are tracking another.

It is an objective of this invention to provide a mobile telecommunication system whereby a communication source residing in a geographic location may poll for the location of communication targets that are present in another geographic area.

It is an objective of this invention to provide a technique to report the location of communication units within a pre-specified boundary.

It is an objective of the current invention to provide adequate technology that would facilitate the disclosure of location information of communication units that are present in a wider than normal geographic area.

It is an objective of this invention to provide a remote unit that could provide location information and geographic boundary information where a search could be initiated for the presence of one or more location reporting communication targets.

It is another objective of the invention to provide a portable mobile device that provides its location to the network only when the device has covered a minimum distance from a reference location prescribed by the network.

Other objects and advantages of the system will appear hereafter.

SUMMARY OF THE INVENTION

The aforementioned objectives are achieved by an improved telecommunication system that can provide location information pertaining to other communication targets that are present within a pre-specified geographic boundary.

In the system, a communication source may query for the location of communication targets at a specified geographic boundary. The communication source may also enter into a mode to determine if another communication unit is tracking it. Communication sources and targets of the system should be able to obtain their location using any relevant location determination technique. This information is conveyed securely across the network based on system and subscriber requirements. When a communication source requires the location information of communication targets in a specific geographic area, the source obtains its location and may determine if the geographic boundary of the required targets is within its querying radii. Although the design could also be such that the network handles all queries, a communication source may poll directly for the location information of targets in a specified geographic boundary. This could happen if the communication targets are within the source's querying radii; preventing unnecessary overloading of shared network resources. For more complex and distant queries, the source may simply provide its location and geographic boundary information where targets should be interrogated for location disclosure. The network utilizes its resources and determines where and how a search for relevant communication targets should be initiated.

Once the search for possible communication targets within the specified geographic boundary is completed, the network provides the communication source with information pertaining to communication target(s) closest to the source and in the geographic region specified by the source.

DETAILED DESCRIPTION OF THE PREFERRED EMBODIMENT

Figure 1:
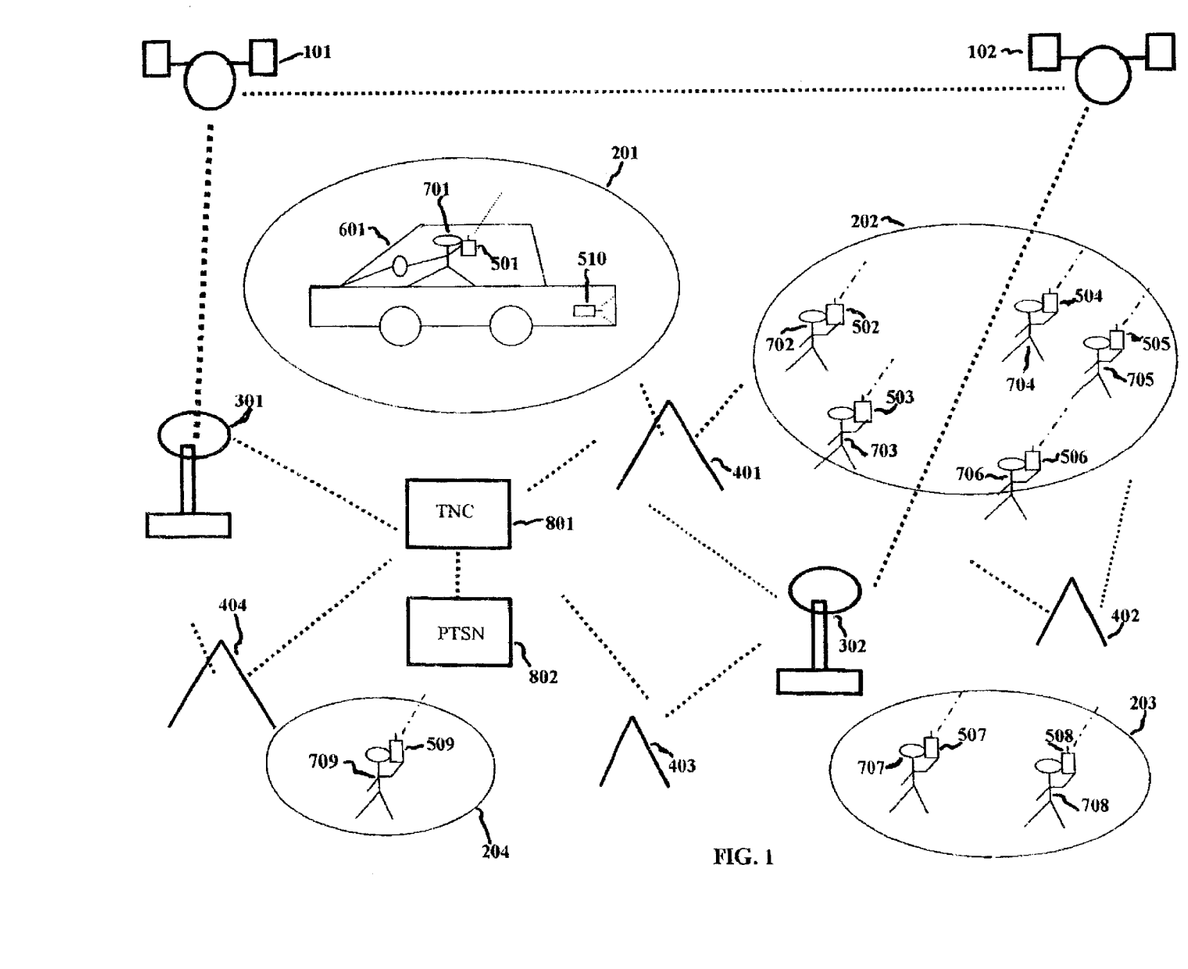
FIG. 1 shows a general schema depicting the invention.

An overview of the present system in accordance with the invention is depicted in FIG. 1. The system consists of a network or portable remote units (PRU) 501–510 scattered throughout a wide geographic area. Mobile Users 701–709 are in possession of the portable remote units 501–509, respectively. Geographic regions 201–204 are standard geographic areas that may have present, one or more portable mobile users 701–709 as shown in FIG. 1. Mobile user 701 is in geographic region 201 and mobile users 502–506 are in geographic regions 202.

Figure 3:
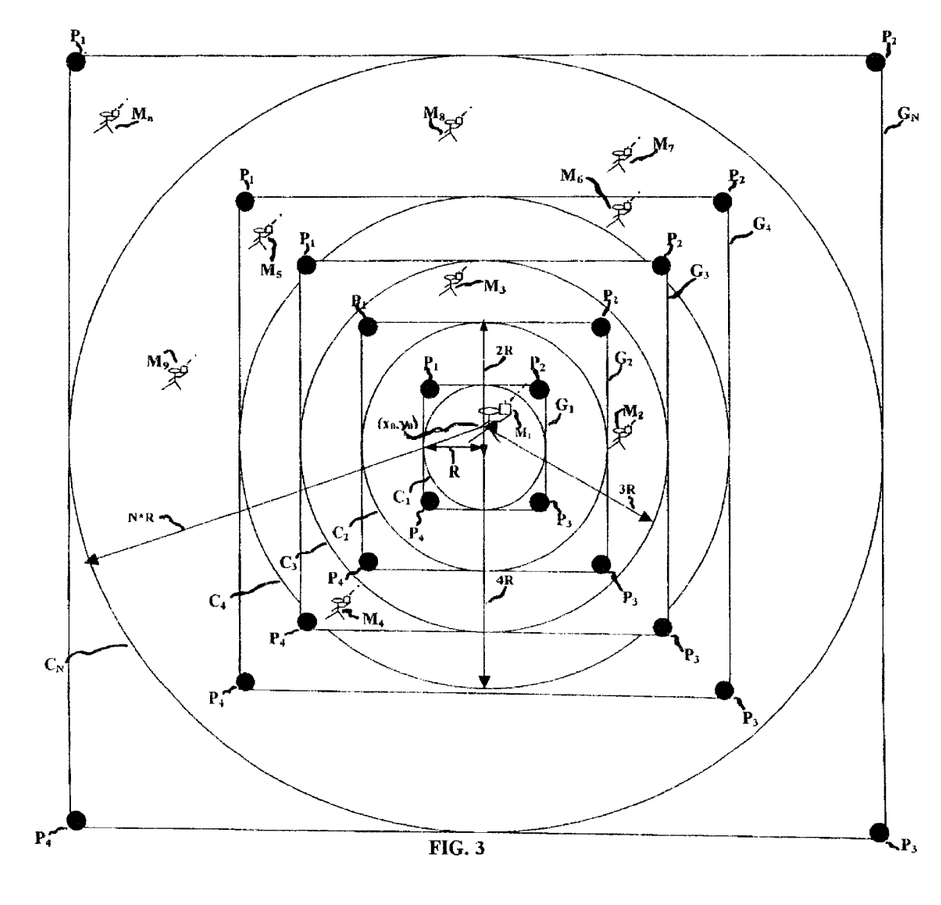
FIG. 3 shows a diagram indicating how a wider than normal geographic area is divided to locate remote units in the area

Other mobile portable users exist in the system and are scattered as shown in FIG. 1. Geographic location 201–204 may simply be defined by latitude, longitude and radii information or simply by points defining the geographic boundary as illustrated in FIG. 3. The terrestrial network center (TNC) FIG. 1, 801 is used to control the actions of the mobile system. The TNC communicates with ground based transmitters (GBT) 401–404 and earth based satellite transmitters 301–302 to relay information pertaining to the mobile system across the network. Other functionalities of the terrestrial network center may include determining which transmitters to employ to complete a call and how to prevent portable remote units from receiving calls when they are out of jurisdiction. Multiple terrestrial control or network centers may be employed as required by the system. Ground based transmitter stations (GBT) FIG. 1, 401–404 are employed to relay mobile information to and from the portable mobile units of the network. Interface to a fixed telephone network such as home telephone or other communication units such as the personal computer could be achieved through the public telephone switching network (PTSN) Satellites 101–102 are employed by the system to relay information to remote areas and also to provide referenced signals, which ground base communication units, may utilize in establishing their geographic location. Communication between the satellites and the ground network is achieved through earth based satellite transmitters 301–302.

Figure 2:
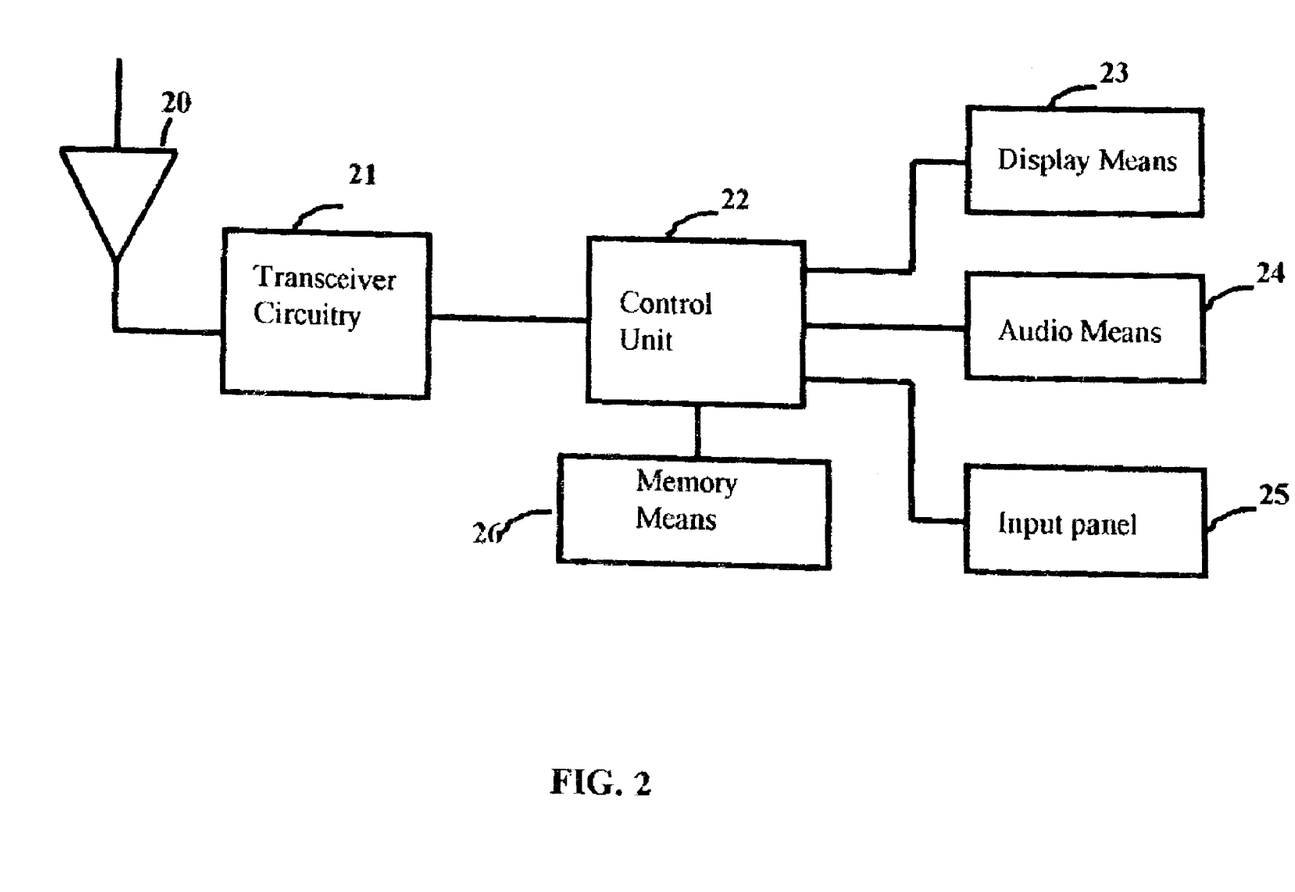
FIG. 2 shows a diagram of a mobile portable remote unit employed by the system.

A general internal circuitry of a portable remote unit or PRU, FIG. 1, 501–510 is shown in FIG. 2. The portable remote unit consists of an antenna 20 and a transceiver circuitry 21. The transceiver circuitry receives and transmits portable remote unit information via the antenna 20. On receipt, this information is processed and the intelligence portion is extracted and sent to the control unit 22 for further processing The transceiver also receives portable remote unit information from the control unit 22, processes it, and forwards it as required to the network via the antenna 20. The control unit 20 controls the action of the PRU. Relevant information pertaining to the PRU could be stored in the allocated memory means 26. The memory means may include a Random Access Memory, a Read Only Memory and additional memory to store PRU data. Input panel 25 is employed to take user instructions and the display 23 is used to present PRU information to a user. The audio means 24 is used for annunciation of voice messages. A PRU may be able to assist the network in determining its global location or use any location determination technique to resolve and provide its location to the network. As a PRU is carried from one location to the other it may obtain and provide information concerning its current location to the network.

As stated in one of the objectives of the invention and illustrated in FIG. 1, a portable remote unit 501, utilized by a subscriber 701, in a moving vehicle 601, could be tracked by a clandestine unit 510, such unit concealed in vehicle 601. A subscriber—let say 704 in region 202—in another geographic region trying to keep track of the whereabouts of user 701 may have concealed unit 510 in vehicle 601 to track subscriber 701. As most portable remote units are small and compact they could easily be hidden without subscriber 701 knowing of such activity. As vehicle 601 travels from one location to the next, authorized users will be able to receive location information from PRU 510 whenever they poll for it. As PRU 510 discloses its location to the authorized party, the party may obtain the location of subscriber 701 without their authorization. It is of utmost importance that a subscriber in possession of unit 501 should be able to determine it they are being tracked by another unit. In the current invention subscriber 701 will at any point in time activate the tracking feature provided by PRU 50 I. This could be achieved by invoking the appropriate function through the input panel, FIG. 2,25 of the PRU. In tracking mode, a tracked PRU, FIG. 1,501, may simply alert a user in possession of the tracked PRU with the location information of any tracking device—PRU 510—that has resided within a pre-specified radius of the tracked PRU, with both units having traveled a minimum distance Parameters such as elapse time, minimum distance traveled and tracking radii could be set as a standard by the industry The tracking feature could be invoked by the tracked PRU or a request could simply be forwarded to the closest ground control station so that the operation is performed for the tracked PRU. In tracking mode, the geographic location of the tracked unit, FIG. 1, 501, is utilized to determine the geographic boundary where a search for possible tracking units 510 could be initiated. Over a period of time and at pre-determined time intervals a page is sent to the geographic location 201 where the tracked unit 501 resides for all location-reporting units within that geographic boundary to disclose their location. The geographic boundary required to establish tracking could be set as a standard by the industry. For instance, it could agreed upon that a unit could be deemed as tracking another it stays within a 5 meter radius of the tracked unit over a 1 mile stretch. As the tracked unit 501 is moving, that unit or an appropriate network unit, may page for the location of other communication units within the tracking boundary of the tracked unit to disclose their location. Only communication units within that geographic boundary would disclose their location. Timing information could also be included in the disclosed information to help eliminate errors that may occur when a tracked unit, FIG. 1, 501, is in a vehicle 601 that is moving at a high velocity. This exercise could be done at fixed time intervals and over a pre-determined time period. At the first time interval, a list could be maintained of all PRUs that responded within the specified geographic boundary defined for tracking. At subsequent time intervals, PRUs that where in the list at the first tracking interval and not responding in later intervals could be eliminated as possible tracking units. At the end of the tracking period, if there are any units in the tracking list and the minimum tracking distance was covered, such communication units are deemed to be tracking another and are reported to the requested party. The minimum traveling distance must be maintained to eliminate the risk of identifying communication units that reside in a fixed geographic boundary over the tracking period as possible tracking units. Also, a maximum time limit must be set for the tracking exercise such that if the minimum distance is not traveled within that time period, then tracking process is aborted. If such a time is not maintained a PRU could be in the tracking mode indefinitely. The steps for this process are shown in FIG. 5.

Figure 5:
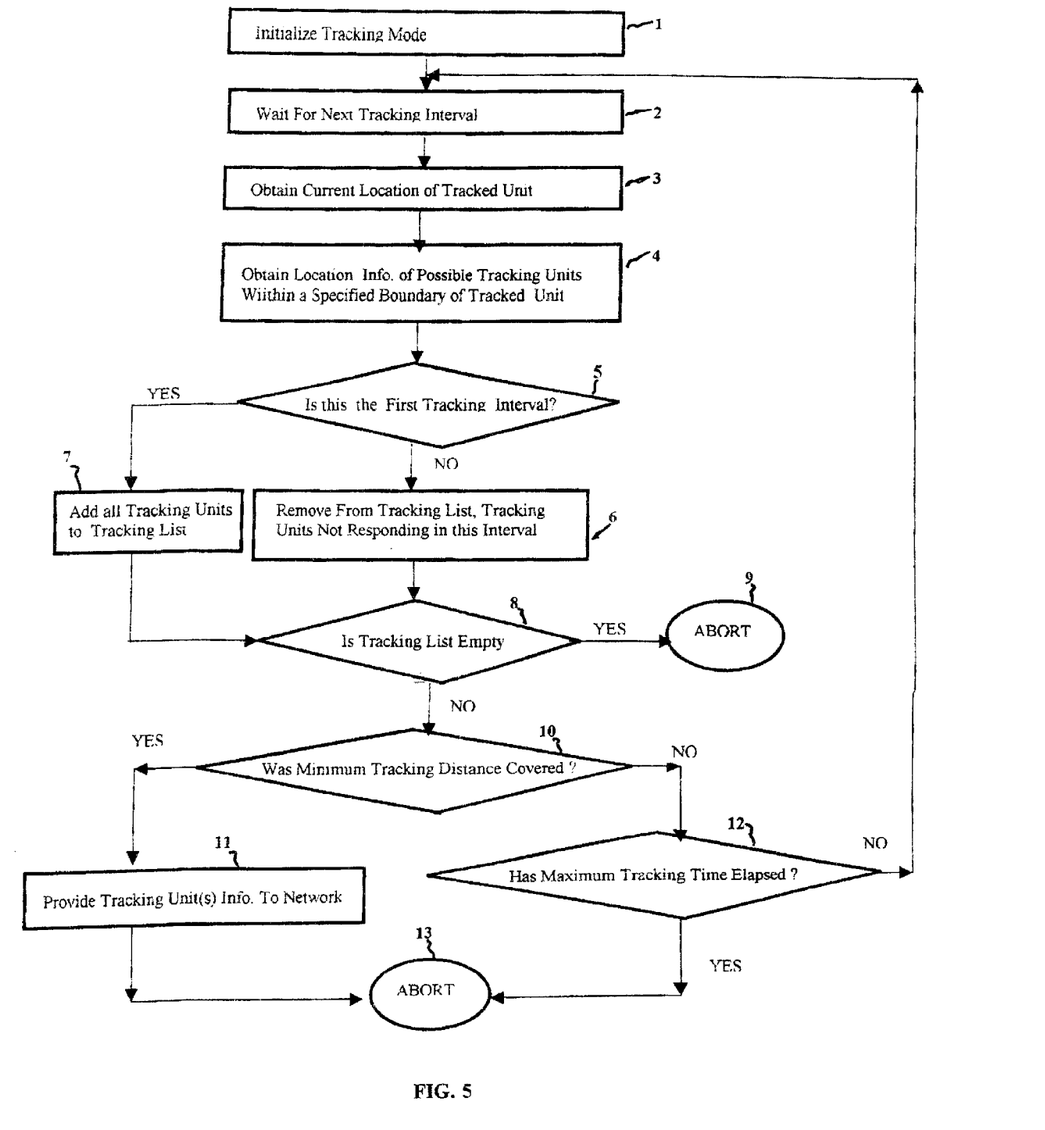
FIG. 5 shows a flow chart illustrating the steps that a communication unit may employ to determine if it is being tracked by another unit.

According to FIG. 5, once the tracking mode is invoked at a search unit, tracking is initialized, FIG. 5, 1. Note that the search unit could be any relevant mobile communication unit trying to identify possible mobile communication units that are tracking another. The search unit then operates repeatedly over pre-defined time intervals 2 until the end of the tracking period 9, 13. At each tracking interval 2, the location of the tracked unit is obtained 3. Possible tracking units within a specified geographic boundary of the tracked unit are paged to reveal their location 4. For the first tracking interval 5, all tracking units that provided their location at that interval are stored in a list 7. At subsequent tracking intervals, a tracking unit that responded in the first tracking interval and not responding in a subsequent tracking interval is eliminated 6 as a possible tracking unit. If the tracking list is empty at any tracking interval 8, the tracking process is aborted 9. A test 10 is next performed to verify that the tracking units in the list traveled the minimum pre-defined distance. If it is determined that the tracking units traveled the minimum distance 10, they are reported as tracking units to the network 11. If it is determined that the tracking units have not yet traveled the minimum distance 10, a check is done to establish if the maximum tracking time has elapsed 12 If no time is left to establish tracking 12, the process is aborted, 13, otherwise it is repeated 2. A maximum time must be set for the tracking process to ensure that a PRU is not in tracking mode indefinitely.

As previously indicated, a PRU may invoke this method directly to determine if other units residing in its immediate geographic area have been tracking it. This would help reduce network overload and, at the end of the tracking period, a status signal may simply be forwarded to the network. In circumstances where a tracked PRU cannot perform this operation, a ground control unit may be employed to carry out the tracking operation for the PRU and report any findings to the PRU Maintaining a list of all tracking units at the first tracking interval is efficient as it reduces storage space and processing time. It is also possible to maintain a list of all units that are within a predefined geographic boundary of the tracked unit throughout the entire tracking process. At the end of the process, the list could be used to determine which units reported their location over a pre-specified distance traveled by the tracked unit.

For a unit to report a global location within a specified geographic boundary, the unit must be able to obtain geographic boundary information and further determine if its location is within the prescribed boundary. There are several techniques well known in the art that a remote unit may employ to resolve its geographic location or assist the network in resolving its location. Once the PRU obtains its location from whatever technique, that information is utilized to perform the functions in accordance with the invention. Apart from determining if a remote unit is being tracked, other uses exist for a remote unit to disclose its location at a particular geographic location. For instance a distress subscriber at a specific global location may simply want to know if there mobile users in the immediate geographic area. Furthermore, a subscriber might want to know if there are any individuals at their home, office or a specified geographic location. By specifying the required location and further information such as radii information, the network may provide a portable remote unit with the location of portable remote targets that are closest to the PRU and in the geographic area specified by the PRU.

For a simple search where the geographic region does not exceed a pre-specified limit, a page may simply be sent to the required region for all units in the region to disclose their location. As it would be inefficient to page for portable remote units in wider geographic boundaries to reveal their location, searches in these areas could be managed differently by the network. In this situation, the network may simply split the wider area into sub regions and recursively query for the location of PRUs, starting in sub-regions that are close to the origin before extending to geographic regions that are further away.

To disclose a global location within a prescribed geographic boundary, a PRU at the geographic location picking up the request must determine if it is within that boundary before providing its location to the network. FIG. 3 shows a geographic location with mobile units $M_1$–$M_N$. This location is divided into cells ($C_1$–$C_N$) or grids ($G_1$–$G_N$) where N is the total number of cells or grids, also known as region. Each region could be defined by its latitude, longitude and radii information or by distinct points that define the grid. Looking at FIG. 3, cell $C_1$ is defined by radius R and its latitude and longitude information is that of mobile user $M_1$ (Xo,Yo). Grid $G_1$ is defined by four points $P_1$, $P_2$, $P_3$ and $P_4$. Subsequent cells and grids are defined in that fashion as shown in FIG. 3. FIG. 3 depicts a wide geographic area. Ground stations and control centers, not shown, may also be available in that area. Such an illustration my also be seen in a general sense in FIG. 1.

As shown in FIG. 3, a distressed mobile user $M_1$ may need to find where another party might exist in that geographic region. The user could initiate a page from their PRU for the closest available PRUs that could be found in that geographic jurisdiction. Looking at FIG. 3, mobile user $M_1$ will provide its location, latitude and longitude (Xo,Yo) to the closest available ground station serving area $C_1$ or grid $G_1$. As stated earlier, appropriate terrestrial technology will be scattered in that region to serve the PRUs in that area as shown in FIG. 1. Once a ground station picks up this signal, it sends a page for all location reporting devices in the specified boundary surrounding mobile unit $M_1$, FIG. 3 to disclose their location. Such boundary information could simply be specified by the latitude and longitude of unit $M_1$ and appropriate radii information. For the very first request, such radii information would be the distance R as shown in FIG. 3. A PRU within that area will pick up the signal and determine if it is within the specified radii. Also, if the ground station specifies grid information for the first cell $G_1$, a PRU will have to determine if it lies within the grid $G_1$ boundary, $P_1$, $P_2$, $P_3$ and $P_4$. According to FIG. 3, when a ground station sends a page for the location of PRUs in cell C, or grid $G_1$ only mobile unit $M_1$ may respond. As $M_1$ is the PRU that initiated the search, the ground control station would make the determination and obtain the next region—radii or grid—information for a possible search. The geographic boundary information of cell $C_2$ or grid $G_2$ will be provided for the next search. Subsequent searches will include incrementing the radii information to from $C_1$–$C_N$ or grid boundary information from $G_1$–$G_N$ until a PRU within that geographic boundary responds or system limitations are encountered. A possible limitation may be the size of a geographic boundary to page for remote unit locations. According to FIG. 3, the radius of each cell is from the origin of mobile unit $M_1$, (Xo,Yo). The radii of subsequent cells is a factor of the radius of the first cell, $C_1$. The grid is usually the tightest rectangular boundary defining the cell. As the grid or cells become larger, exclusion zones, as described hereinafter, may also be specified if it is required that PRUs in certain areas should not disclose their location. Another possibility might be not to increase the next geographic area on a subsequent page but split the entire geographic boundary into small regions of about the same size. Each region could then be paged, starting in areas that are closed to the origin. This could be done until a PRU at a region discloses their location.

Considering that mobile unit $M_1$ is initiating a search for possible portable remote units in its immediate area, a relevant ground control station will send three pages. The first page will cover cell $C_1$ or grid $G_1$. As no units are available in the area a second page will be sent to cover cell $C_2$ or grid $G_2$. Examining FIG. 3, the next PRUs exist only in cell $C_3$ or grid $G_3$. Once a page is sent out for cell $C_3$, PRU, $M_2$ and $M_3$ will respond. If grid $G_4$ is specified PRU $M_2$, $M_3$, $M_4$ and $M_5$ will respond. The ground control station will next select the unit closest to PRU $M_1$, which is $M_2$, in this instance. The location of PRU $M_2$ will then be forwarded to PRU $M_1$. $M_1$ may also choose to request for the number of PRUs in its area and the ground control station would respond again, based on system requirements. Using the system, a user in possession of a PRU may check for the existence or other PRUs at another geographic location. A user may select a geographic area from a map presented by the PRU. In FIG. 1, a mobile user 709 at location 204 may utilize this system to request for the location of mobile units in another geographic region such as 202 or 203. This could be for instance, checking to see if there are PRUs at the office or house or any location of interest. The system would simply return the appropriate information such as number of PRUs responding, location of PRUs and relevant information requested. In such a system, subscribers may choose to participate to have their location disclosed when a search is initiated. Subscribers may also opt to block or activate this feature at any time at the network. A subscriber to the service may be charged a fee each time the system is used. A possible technique utilized to implement the above is shown in FIG. 7.

Figure 7:
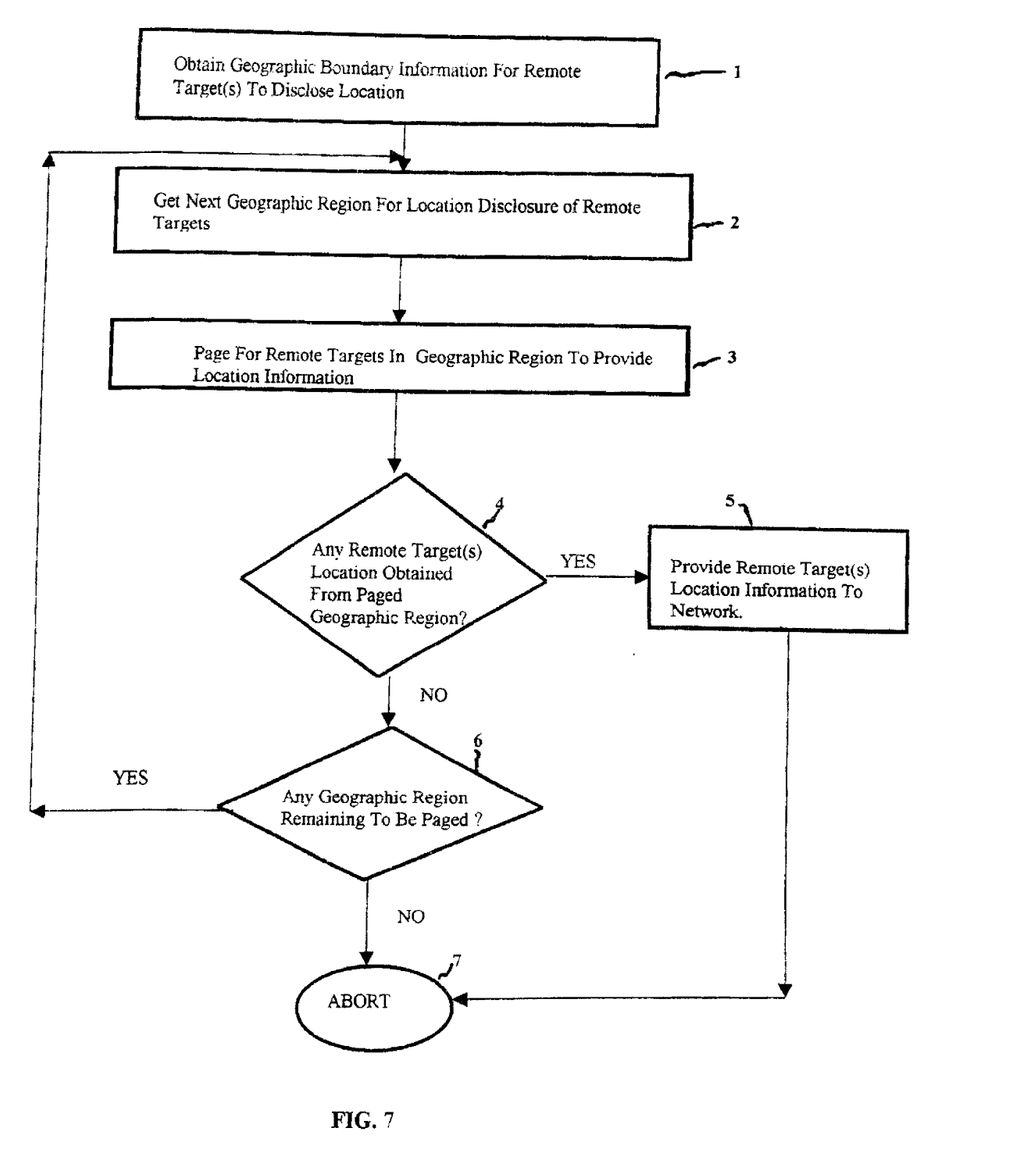
FIG. 7 is a flow chart illustrating how a search for the location of mobile communication units in a wider than normal pre-specified geographic boundary is carried out.

According to FIG. 7, the geographic information of the area where a search for possible remote targets sought is first obtained. This information could be provided by a PRU to the network. This information may simply be the latitude and longitude of the area where the search would be performed and other relevant information to assist the network with the search. A PRU may display a map where a user may select a specific geographic area. From this information the next geographic region where a possible search for PRUs is estimated 2. This could be the latitude longitude and radii information of the searched area. Also, the tightest rectangular grid surrounding the cell having that radii information could also be calculated and utilized. Once that information is obtained a page is sent out to that geographic region for remote units in the region to reveal their location 3. If remote units are identified in the paged area 4, that information is forwarded to the network 5 and the process is aborted 7. If no remote units are identified in the area 4, a check is done to establish if there are any remaining cells or grids higher up in the chain to be searched 6 If no regions exist for a possible search, the process is aborted, otherwise, the process is repeated until all geographic cells or grids have are searched for the existence of portable remote units.

Whenever a portable remote unit receives a page to disclose its location within a specified geographic boundary, the PRU obtains its location and attempts to determine if it is within that boundary. As mentioned before, the PRU may employ any relevant location determination technique well known in the art to obtain its geographic location. If the boundary information specified by the network contains a well-defined set of points—latitude and longitude for that region—defining the geographic region, the PRU will simply establish if its location is within the geographic boundary and provide its location to the network based on that. The points may simply define the minimum and maximum latitude and longitude values within which a PRU should respond. Such a procedure would be stored in the memory means, FIG. 2,26 of the PRU and invoked by the control unit FIG. 2,22 of the PRU as required. If the network simply provides the origin—latitude and longitude—and radii information of the region where a search is to be performed, the PRU will utilize these values to establish if it is within the area defined by the network as shown in FIG. 4.

Figure 4:
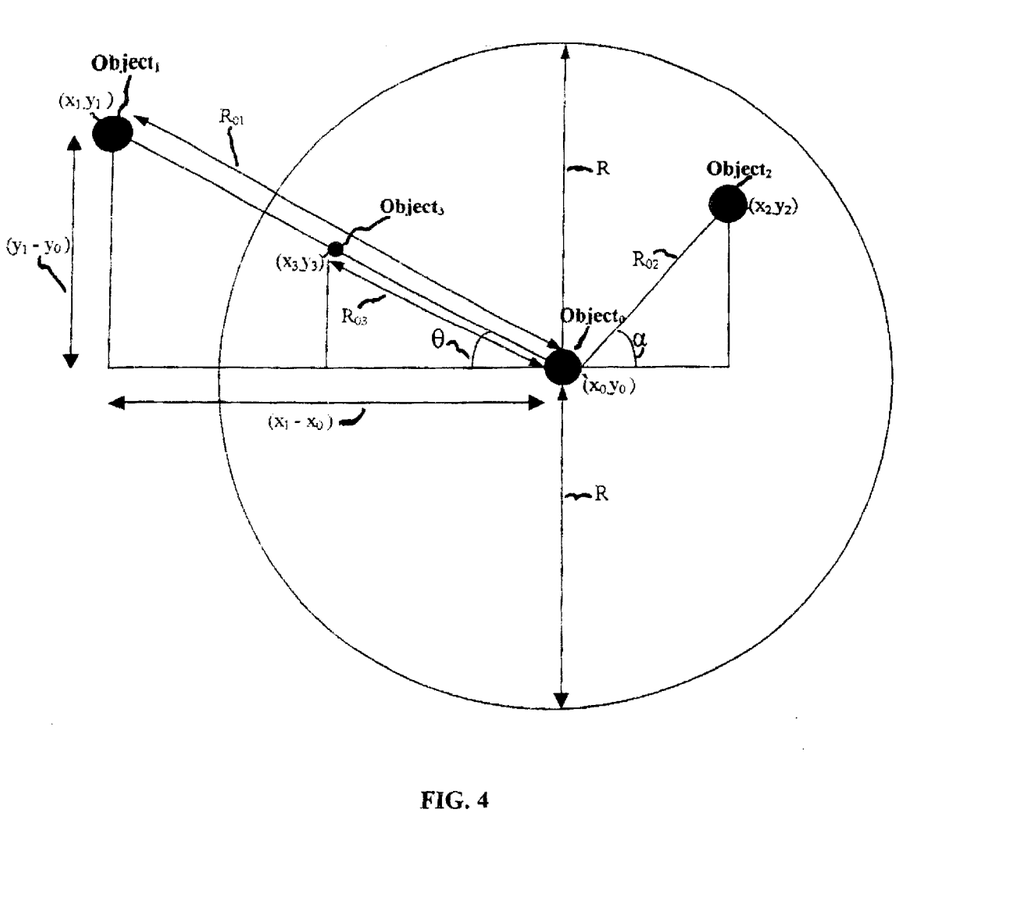
FIG. 4 shows a diagram that is employed to determine if a remote unit is within a prescribed geographic boundary.

FIG. 4 shows four mobile objects, $Object_0$, $Object_1$, $Object_2$ and $Object_3$. Considering that $Object_0$ is the source and needs to know if any portable remote units are available in the geographic region of radius R. The location of $Object_0$ is the origin of the region and the radii information provided by the network for that region is R. All objects within that radius must respond upon receiving the signal requesting for their location in the specified radii. Looking at FIG. 4, only $Object_3$ and $Object_2$ exist in the region specified and would respond to the page. If all the mobile objects are served by the same ground station they will all receive the signal for location disclosure if in the region. To establish if they are within the region specified, each mobile object will obtain its location and calculate its tangential information from the specified geographic origin (Xo,Yo) defined by the source, $Object_0$. The tangent of an angle is usually the opposite/hypotenuse: Looking at FIG. 4, the tangent is between the origin of $Object_0$ and $Object_1$, and that angle is $\theta$. As $Object_3$ lie on the same line as $Object_1$ the tangent between the origin of Object0 and Object3 is also $\theta$. The tangent between the origin of Object0 and Object2 is $\alpha$. Standard trigonometric equations dictate that the tangent of an angle is the opposite/hypotenuse. According to FIG. 4, Tan $\theta=(y_1-y_o)/(x_1-xo)$ for $Object_1$ and $(y_3-y_o)/(x_3-xo)$ for $Object_3$, for $Object_2$ Tan $\alpha=(y_2-y_o)/(x_2-xo)$. Once the inclination or tangent of the object to the origin is calculated, the distance of the object to the origin could easily be calculated by using the sine formula—Sine $\theta$=opposite/hypotenuse where the opposite is $(y_1-y_o)$, $(y_3-y_o)$ for Object and $Object_3$ respectively. The hypotenuse is the distance from the mobile object to the origin; $Ro_1$ and $Ro_3$ for $Object_1$ and $Object_3$ respectively. For $Object_2$, the distance from the origin $R_{o2}=(y_2-yo)/Sine$ $\alpha$. Once the distance from the origin (XoYo) is calculated for each mobile object, an evaluation could easily be made as to whether the mobile object lies within the specified boundary and the location of the mobile object could be provided to the network based on that. Furthermore, the network may choose to provide an exclusion region or regions to the portable mobile remote units or PRUs. A PRU in that exclusion region will not disclose its location to the network even if it lies in the network's specified geographic boundary. This exclusion zones may be specified simply as grid points anywhere in the paged region or as a direction aft the origin. A direction aft the origin contains information that will indicate to PRUs in the region not to disclose their location if they are East, West, North or South of the origin. Considering FIG. 3 as a further example, if a request is received in that region for the location of mobile units in $G_4$ or $C_4$ and the origin is the location of $M_1$, with the exclusion zone specified as East, all the mobile units in $G_4$ or $C_4$ will receive the request to disclose location in that area. Upon detecting the exclusion zone information in the signal only the mobile units to the West of $M_1$ will reveal their location. Again, such exclusion zone information may simply specify sub region(s), where PRUs should not reveal their location.

Figure 6:
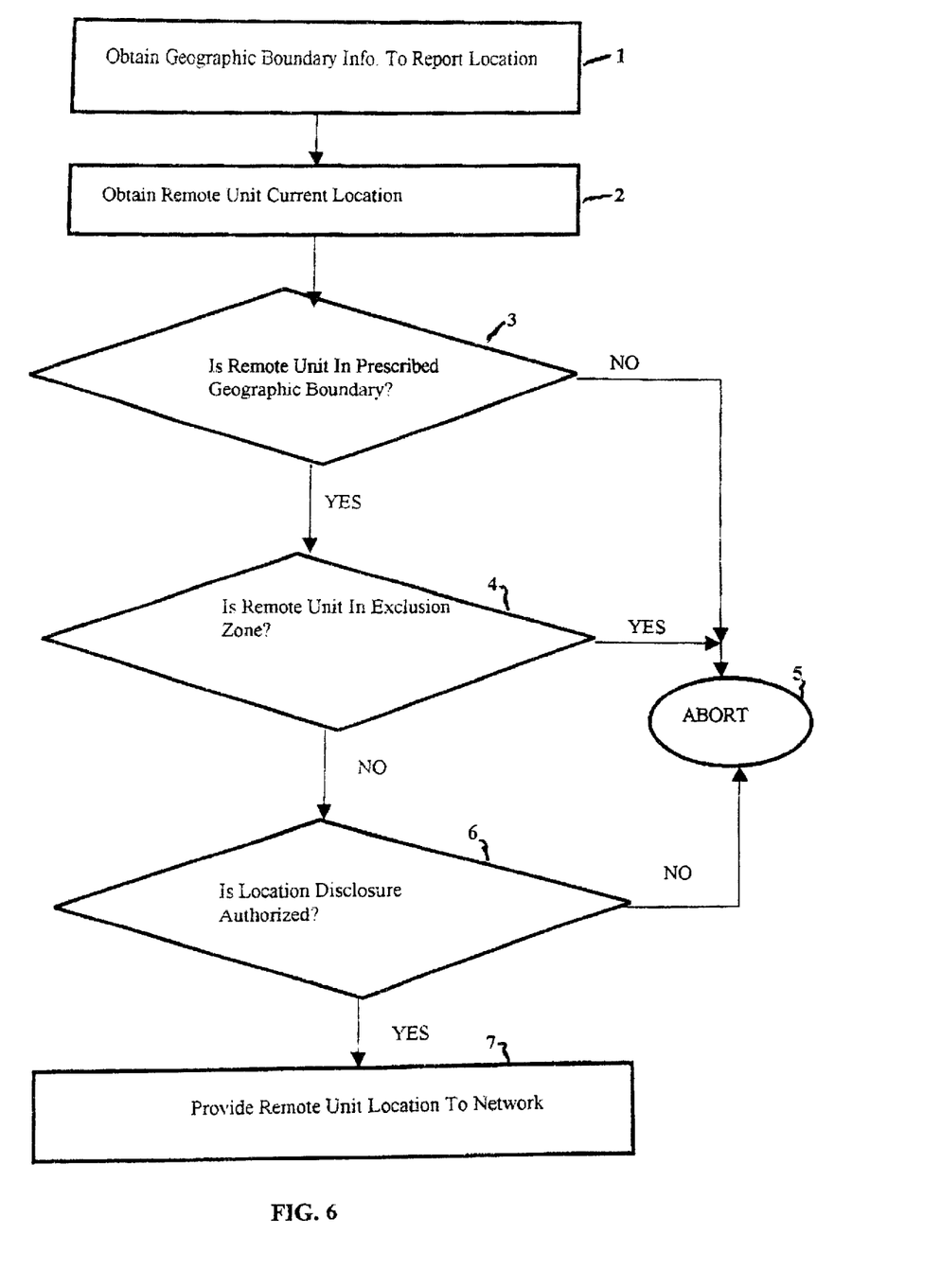
FIG. 6 is a flow chart illustrating the steps utilized by a communication unit to disclose a global location when the unit is within a pre-specified geographic area.

FIG. 6 shows the steps utilized by a remote unit to reveal its location if it is within the geographic boundary specified by the network The unit first obtains geographic boundary information specified by the network 1. This information may consist of latitude and longitude information defining the region's origin and radii information. The unit next obtains its location 2. This could be done in association with the network or by using any remote unit location determination techniques such as GPS. The next step is to determine if the unit is within the boundary prescribed by the network 3. Such a technique has already been described in the invention. Further checks are carried out to ensure that remote unit is not in a location reporting exclusion zone defined by the network 4. The location of the remote unit is provided to the network 7 once it is established at the remote unit that the subscriber 6 authorized such an action.

It could be made mandatory that all PRUs reveal their location once they receive a request to establish tracking. A PRU may not respond to any tracking establishing routines if it is at a fixed location. Tracking is only possible when the tracking and tracked unit are in motion. If a network's request is just to establish if a PRU is within a geographic location, the PRU's response could be based solely on the requirements of the subscriber—whether such action is authorized or not. A PRU may choose to instruct the network to relay certain information to mobile units in a specific geographic region. That information would then be appended to the geographic boundary information and beamed in the specified geographic region. The target PRUs would determine if they are in the specified boundary before alerting a subscriber as to the content of the message. In circumstances where a subscriber in possession of the PRU is in motion and a request is received for the location of the PRU if within a specified region, the PRU may provide this information and also provide additional information such as its velocity to the network. This might help a party seeking help to establish if they would be able to catch up with another subscriber in the region which help was sought. Also, a party requesting for the location of remote units in a geographic boundary may also forward maximum velocity information. If a PRU is in the region and establishes its velocity is above what is specified, no response is sent to the network. A PRU may calculate its velocity by using the equation, velocity=distance/time. At time intervals $T_1$ and $T_2$, a PRU may obtain its location, $Y_1$ and $Y_2$ and calculate the distance between these two points, as previously disclosed. The velocity is given by (distance between $Y_2$ and $Y_1$)/(Time at $Y_2$–Time at $Y_1$ Such information could then be provided to the network. In situations where a PRU cannot perform any of the tasks described herein, the network may obtain its location information and the required functions performed at the network and forwarded to the appropriate communication target on completion.

In the invention, portable mobile remote units would find the need to routinely update the network with their location information over time. As lots of PRUs exist in the network this could prove difficult for the network to manage. Considering that most PRUs usually travel a small distance over time, it would prove insignificant if their location is continuously provided to the network. A solution will be to instruct the PRU to provide its location to the network only if the location has changed by a constant, such constant defined from a reference position provided by the network. In this scenario, an initial reference location and radii is provided to the PRU, from within which the PRU should not disclose its location to the network. So long as the PRU is within the undisclosed geographic boundary, its location will never to provided to the network. Once the PRU is out of this boundary a new undisclosed geographic boundary is provided to the PRU. With this technique the network will not be burdened with managing insignificant changes in the location of the mobile device, for a time. If for instance, the undisclosed radii is set to five miles, the reference coordinate would always be updated each time the PRU travels in excess of five miles off its original reference position. The network or the user may control the undisclosed radii value to ensure reasonable disclosure of location information t.o the network. The network may, of course, override this feature at anytime to obtain the location of a PRU at any time.

The invention also teaches a way to determine if a mobile device is tracking another by examining the location information of the tracking and tracked device over a period of time. Another possibility could be to examine the characteristics of signals emitted from tracking devices that are within close proximity of the tracked device during the tracking period. Such characteristic may include monitoring signal strength and other relevant information—such as location—provided by a tracking device to establish if the device is continuously present within proximity of the tracked unit over time. Also, tracking devices that are within proximity of the tracked device could be instructed to provide their information at predetermined time intervals over the tracking period. The intervals and tracking period could be set and forwarded to the relevant geographic location by the network. The devices picking up that information will periodically update the required information to a control unit at the network and the end of the tracking period the control unit will process the information and determine if a mobile unit is being tracked within the system.

What is claimed is:

1. A communication system comprising:
   a portable mobile remote unit;
   a network of communication units;
   means to obtain the location of the portable mobile remote unit;
   means to obtain geographic boundary information in order to disclose a global location at the network;
   means to provide the location of the portable mobile remote unit to the network upon determination that the portable mobile remote unit is within the geographic boundary obtained at the network;
   means to determine and report to the system upon request that, another mobile remote unit of the network has tracked the portable mobile remote over a period of time.

2. The portable mobile remote according to claim 1, having means to further determine if location disclosure for the remote unit is prohibited at a specific geographic boundary before sending its location to the network.

3. The portable remote unit of claim 1 having means to establish its velocity at the network and having means to further determine that, its velocity is within the network's prescribed velocity before divulging its location to the network.

4. A communication system for providing the location of portable mobile remote units, in a geographic region to a wireless consumer requesting that information comprising:
   i) means for the wireless consumer to specify and forward to system a network, geographic boundary information describing the geographic region where the location of portable mobile remote units are required by the wireless consumer;
   ii) means to request that all portable remote units within said geographic boundary (i) establish their location at the network;
   iii) means to verify at a portable remote unit if the portable remote unit is within said geographic boundary of said request (ii) before establishing the location of the portable remote unit at the network;
   iv) means to verify at the network, after said request (ii) that a portable remote unit according to (iii) responded with location information;
   v) means to provide to the wireless consumer the location of a portable mobile remote unit that exist in the geographic boundary defined by the wireless consumer after the verification of (iv).

5. The system of claim 4, the portable mobile remote units able to establish and report their location to other communication units of the system.

6. The system of claim 4, having means to split wider geographic boundaries defined by a wireless consumer into sub regions and further means to recursively request for the location of portable mobile remote units within each sub region until a portable mobile remote unit responds with location information.

7. The system of claim 4, a portable mobile remote unit having means to establish its velocity at the network and having means to further determine that, its velocity is within the network's prescribed velocity before divulging its location to the network.

8. The system of claim 4, a portable mobile remote unit having means to further determine if location disclosure for the remote unit is prohibited at a specific geographic boundary before sending its location to the network.

9. A method for providing the location of portable mobile remote units to a wireless consumer requesting the location of portable mobile remote units within a geographic region of a communication system comprising:
   i) obtaining from the wireless consumer, geographic boundary information indicating where a search should be undertaken for portable mobile remote units;
   ii) providing the information defined in (i) to a control unit of the system;
   ii) generating at said control unit a request for the location of portable mobile remote units within said geographic boundary;
   iii) receiving at the portable mobile remote unit geographic boundary information (ii), within which the location of the portable mobile remote unit should be disclosed;

iv) establishing at the portable mobile remote unit if the unit is within said geographic boundary (iii) and, if yes, forwarding the location information of the unit to the system;

v) verifying after said request (ii), whether a portable mobile remote unit in said geographic boundary responded with location information according to (iv);

vi) providing to the wireless consumer, at least the identity and location of a portable remote unit after the verification of v.

10. A method further employed in 7 to obtain the location of mobile remote units wherein said prescribed geographic boundary obtained from the wireless consumer is wider than normal, comprising;

i) splitting the wider than normal geographic boundary into sub geographic regions to constitute the geographic boundary;

ii) requesting in the sub geographic region(s), the location of remote units that are present in each sub region;

iii) verifying after each request of (ii) in a sub region, whether at least a portable remote unit disclosed a global location in the region;

iv) maintaining a list of all remote units that disclosed their location after each request from the verification of step (iii);

v) providing to the system and from the list of (v) the location of at least a remote unit that revealed its location in the sub region.

11. A technique according to claim 10, utilized to terminate a request for the location information of portable mobile remote units in the prescribed geographic boundary comprising:

checking to establish that a request for remote unit location information was undertaken in all re-defined or sub regions of the prescribed boundary or a portable remote unit in a defined or sub region responded with location information.

12. A method utilized to provide to a source of request, the location of mobile remote units that exist in a geographic region from the list according to claim 10 comprising:

(i) estimating and obtaining from the list, the location mobile remote units that are closer to the source of request;

(ii) providing the information obtained in (i) to the source of request before releasing the location of other mobile remote units that are further from the source of request.

13. A method according to claim 9 utilized to further limit the provision of a remote unit location to the network comprising:

obtaining at the network, exclusion region information within which the remote unit should not provide its location the network;

determining that the remote unit is not in the exclusion region before providing the location of the remote unit to the network.

14. A method further employed in 9 to determine if a portable mobile remote unit is within a specific geographic boundary defined by the system comprising:

i) receiving at the portable mobile remote unit geographic boundary information and velocity information, within which the location of the portable mobile remote unit should be disclosed;

ii) establishing at the portable mobile remote unit if the unit is within said geographic boundary and, if the velocity of the unit is within the values prescribed by the network;

(iii) if the result of (ii) is yes, forwarding the location of the portable mobile remote unit to the system.

15. A method for determining that a first portable remote unit of a wireless consumer associated with a network is being tracked by at least a second portable remote unit that is in motion with the first portable remote unit over a tracking period comprising;

i) obtaining the location information of the first portable mobile remote unit, said location information provided at intervals during said tracking period;

ii) obtaining the location information of the at least second portable communication unit that is within a specified geographic boundary of the first portable remote unit, said location information provided at intervals during said tracking period;

iii) using the location obtained according to step (i) and (ii) to verify whether the first portable remote unit and second portable remote unit have maintained relative proximity during the tracking period;

iv) forwarding the result of the verification to a network requestor at the end of the tracking period.

16. A technique according to claim 15, utilized to determine if the second mobile remote unit is within a specified geographic boundary or within close proximity of the first portable mobile remote unit comprising:

obtaining radii information of the geographic boundary from the network;

obtaining geographic information describing the origin of the geographic boundary;

calculating the angle of inclination of the second remote unit to the geographic boundary origin;

calculating from the angle of inclination the distance between the second remote unit and the geographic boundary origin;

comparing the radii of the geographic boundary to the calculated distance to establish if the second remote unit lies in the geographic boundary.

17. A technique employed by the method according to claim 15 to determine if a second remote unit is within a specified geographic boundary or close proximity to the first portable remote unit comprising:

obtaining from the network geographic information describing the geographic boundary;

estimating at the second remote unit if the current location of the remote unit is within the geographic boundary obtained at the network.

18. A technique utilized in the method according to claim 15, to terminate obtaining at each interval, the location of second portable mobile remote units that are within close proximity of the first portable remote unit comprising;

i) keeping track of the time since the first request for tracking units within proximity of the first portable remote unit was enacted by the system;

ii) validating that the elapsed time at each interval when a request is to be made does not exceed the total time set for establishing tracking in the system;

iii) requesting that all mobile remote units within close proximity of the first portable remote unit divulge their location if the result of the validation of (ii) is true.

19. The verification technique employed in the method of claim 15(iii) comprising:

retaining a tracking list of all second portable mobile units or tracking units that are within a pre-specified radius or region of the first unit or tracked unit at the first tracking interval;

eliminating or removing at subsequent tracking intervals, all tracking units in the tracking list that do not report their location during a subsequent tracking interval;

validating at the end of the tracking period that at least a tracking unit exist in the tracking list and a minimum distance was traveled by the tracked unit.

20. Another verification technique employed in the method of claim 15(iii) comprising:

i) maintaining a list of all second portable remote units/tracking units that provided their location during said tracking period;

ii) from the list of (i), forwarding the location of the second portable mobile remote unit to the network upon determination that said second portable mobile remote unit maintained close proximity to the first mobile remote during the tracking period.

21. A technique employed by the method according to claim 15 to verify whether the first portable remote unit and second portable remote unit have maintained proximity during said tracking period further comprising verifying whether the first and second portable remote units maintained a relative distance after traveling a minimum pre-specified distance during the tracking period.

22. A communication system comprising:

(i) a network of communication units;

(ii) at least a first communication unit and at least a second communication unit able to provide location information to the network for a time while in motion;

(iii) means to request whether the at least second communication unit is tracking the at least first communication unit;

(iv) means to determine from said location provided (ii) that the at least first and second communication unit maintained proximity while in motion during said time;

(vi) means to provide result of the determination (iv) to the requestor of (iii).

23. The system of claim 22, the at least first communication unit able to invoke a tracking mode at the at least first communication unit in order to determine if a clandestine unit is tracking it.

24. The system of claim 22 having means to maintain an inventory of all second communication units that are providing their location within proximity to the first communication unit during said time and having further means to determine and report a second communication unit in said inventory that has maintained proximity to the first communication unit during said time.

25. The system of claim 22 having means to abort the tracking request process if it is determined that either the first or the communication units are not in motion or the tracking period has expired.

26. A method for providing the location of a portable remote unit that exists within a prescribed geographic boundary in a wireless network comprising:

i) providing geographic boundary information to the mobile remote unit in a geographic region to disclose their location;

ii) further providing exclusion region information associated with said geographic boundary of (i) to the mobile remote unit in the geographic region;

iii) determining that a mobile remote unit is in the geographic boundary of (i) and not in the exclusion region of (ii) before providing the location of the mobile remote unit to the network.

27. A method for providing the location of a portable remote unit that exists within a prescribed geographic boundary to a wireless network comprising:

i) providing to remote units in the geographic boundary velocity information required in order to divulge location information;

ii) estimating at the remote unit or network, the velocity at which the remote unit is moving;

iii) validating that the estimated velocity of the remote unit meets the velocity requirement provided by the network (i), if yes, forwarding the location of the remote unit to the network.

* * * * *